US010427889B2

(12) United States Patent
Hsiao et al.

(10) Patent No.: US 10,427,889 B2
(45) Date of Patent: Oct. 1, 2019

(54) TRANSMISSION EQUIPMENT

(71) Applicant: Delta Electronics, Inc., Taoyuan (TW)

(72) Inventors: Yuan-Kun Hsiao, Taoyuan (TW); Jian-Jang Lai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/114,979

(22) Filed: Aug. 28, 2018

(65) Prior Publication Data

US 2018/0362260 A1    Dec. 20, 2018

Related U.S. Application Data

(63) Continuation-in-part of application No. 15/855,537, filed on Dec. 27, 2017.

(30) Foreign Application Priority Data

May 24, 2017    (CN) .......................... 2017 1 0371190

(51) Int. Cl.
*B65G 47/53*    (2006.01)
*B65G 35/06*    (2006.01)
(Continued)

(52) U.S. Cl.
CPC ............ *B65G 47/53* (2013.01); *B65G 15/12* (2013.01); *B65G 17/002* (2013.01); *B65G 21/22* (2013.01);
(Continued)

(58) Field of Classification Search
CPC ...... B65G 13/10; B65G 17/002; B65G 21/22; B65G 35/06; B65G 39/20; B65G 43/08; B65G 47/53; B65G 47/54; B65G 2201/0267; B65G 2812/02069; B65G 2812/02079
See application file for complete search history.

(56) References Cited

U.S. PATENT DOCUMENTS 3,613,864 A    10/1971    Lingg
4,899,865 A    2/1990    Keil
(Continued)

FOREIGN PATENT DOCUMENTS

CN    102060193 B    4/2013
EP    0417041    3/1991
(Continued)

*Primary Examiner* — Gene O Crawford
*Assistant Examiner* — Keith R Campbell
(74) *Attorney, Agent, or Firm* — Muncy, Geissler, Olds & Lowe, P.C.

(57) ABSTRACT

Transmission equipment is provided. The transmission equipment includes a carrier and a transmission rail. The carrier includes at least one carrier guiding structure. The transmission rail includes a first rail, a second rail and a turning unit. The first rail includes at least one first transmission member. The second rail includes at least one second transmission member. The turning unit includes a first guiding slot, a second guiding slot and a turning member. At least one portion of the first guiding slot is parallel to the first rail. At least one portion of the second guiding slot is parallel to the second rail. The turning member moves between a first position and a second position.

8 Claims, 11 Drawing Sheets

(51) Int. Cl.
    *B65G 21/22*     (2006.01)
    *B65G 15/12*     (2006.01)
    *B65G 17/00*     (2006.01)
(52) U.S. Cl.
    CPC ...... *B65G 35/06* (2013.01); *B65G 2201/0267* (2013.01); *B65G 2812/02069* (2013.01); *B65G 2812/02079* (2013.01)

(56) References Cited

U.S. PATENT DOCUMENTS

| | | | |
|---|---|---|---|
| 5,272,985 A | 12/1993 | Drexel | |
| 5,412,863 A | 5/1995 | Prodel | |
| 7,600,629 B2 | 10/2009 | Skljarow | |
| 7,708,134 B2 * | 5/2010 | Doan | B65G 17/002 |
| | | | 198/787 |
| 2007/0017778 A1 | 1/2007 | Skljarow | |

FOREIGN PATENT DOCUMENTS

| | | | | |
|---|---|---|---|---|
| EP | 0417041 A1 * | 3/1991 | ............ | B65G 35/06 |
| JP | 08-332948 A | 12/1996 | | |
| JP | 11-296226 A | 10/1999 | | |
| JP | 2001-071895 A | 3/2001 | | |
| JP | 2002-087250 A | 3/2002 | | |
| JP | 2006-241684 A | 9/2006 | | |

\* cited by examiner

TRANSMISSION EQUIPMENT

CROSS REFERENCE TO RELATED APPLICATIONS

This application is a Continuation of pending U.S. patent application Ser. No. 15/855,537, filed Dec. 27, 2017 and entitled "Transmission equipment", which claims priority of China Patent Application No. 201710371190.1, filed on May 24, 2017, the entirety of which is incorporated by reference herein.

BACKGROUND OF THE INVENTION

Field of the Invention

The present invention relates to transmission equipment, and in particular to transmission equipment with a carrier which can change its direction of movement.

Description of the Related Art

Conventional transmission equipment that includes a carrier and can change its direction of movement utilizes a lift transfer unit and transverse conveyor to change the direction of the carrier. There must be a height difference between the different rails. However, when the carrier changes its direction, the transmission of the main rail of the transmission equipment must be stopped. The transmission of the main rail may be restarted after the carrier has finished changing its direction. Therefore, the production efficiency of conventional transmission equipment is low.

BRIEF SUMMARY OF THE INVENTION

In one embodiment, transmission equipment is provided. The transmission equipment includes a carrier and a transmission rail. The carrier comprises at least one carrier guiding structure. The transmission rail comprises a first rail, a second rail and a turning unit. The first rail comprises at least one first transmission member. The second rail comprises at least one second transmission member. The turning unit comprises a first guiding slot, a second guiding slot and a turning member. At least one portion of the first guiding slot is parallel to the first rail. At least one portion of the second guiding slot is parallel to the second rail. The turning member moves between a first position and a second position. In a first state, the turning member is in the first position, the carrier guiding structure enters the first guiding slot and passes over the turning member, and the carrier keeps moving in the first rail. In a second state, the turning member is in the second position, the carrier guiding structure enters the first guiding slot and is guided by the turning member into the second guiding slot, and the carrier then moves in the second rail.

In one embodiment, the carrier guiding structure comprises a plurality of carrier guiding posts. The carrier guiding posts are adapted to rotate relative to the carrier.

In one embodiment, the carrier guiding posts are disposed on two sides of the carrier.

In one embodiment, the first rail is perpendicular to the second rail. The turning member is located between the first guiding slot and the second guiding slot. An included angle between the first guiding slot and the second guiding slot is 90 degrees. When the carrier moves from the first rail to the second rail, the carrier turns 90 degrees.

In one embodiment, the transmission equipment further comprises a support unit disposed in the first rail. In the second state, the support unit supports the carrier.

In one embodiment, the support unit comprises a support roller.

In one embodiment, the carrier comprises a first portion and a second portion. In the second state, the support unit supports the first portion of the carrier, and the second portion is located between the first portion and the turning unit.

In one embodiment, the first rail is parallel to the second rail.

In one embodiment, the first guiding slot comprises a first section and a second section. The second guiding slot comprises a third section and a fourth section. The first section is parallel to the first rail. The fourth section is parallel to the second rail. The second section is parallel to the third section. The turning member is located between the first section and the second section.

In one embodiment, in the second state, the turning member is in the second position, and the carrier guiding structure enters the first section, guided by the turning member, and passes the second section, the third section and the fourth section, and the carrier then moves in the second rail.

In one embodiment, the transmission equipment further comprises a support unit disposed between the first rail and the second rail. In the second state, the support unit supports the carrier.

In one embodiment, the support unit comprises a support roller.

In one embodiment, the turning unit further comprises a first shunting post and a second shunting post. The carrier comprises a first carrier slot and a second carrier slot. When the carrier moves between the second section and the third section, the first shunting post and the second shunting post respectively enter the first carrier slot and the second carrier slot to guide the carrier.

In one embodiment, when the carrier moves between the second section and the third section, the carrier moves in a shunting direction, and an included angle between the shunting direction and the first rail is 45 degrees.

In one embodiment, the second shunting post and an inlet of the third section are located on a first straight line. The first straight line is parallel to the first rail.

In one embodiment, the turning unit further comprises a third shunting post. The second shunting post and the third shunting post are on a second straight line. The second straight line is parallel to the shunting direction.

In one embodiment, two side walls of the first carrier slot extend separately at the two ends of the first carrier slot. Two side walls of the second carrier slot extend separately at the two ends of the second carrier slot.

Utilizing the transmission equipment of the embodiment of the invention, the mail rail (for example, the first rail or the second rail) keeps moving when the carrier changes its direction. The production efficiency is therefore increased. Compared to conventional transmission equipment, the transmission equipment of the embodiment of the invention has a simpler structure and improved reliability.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
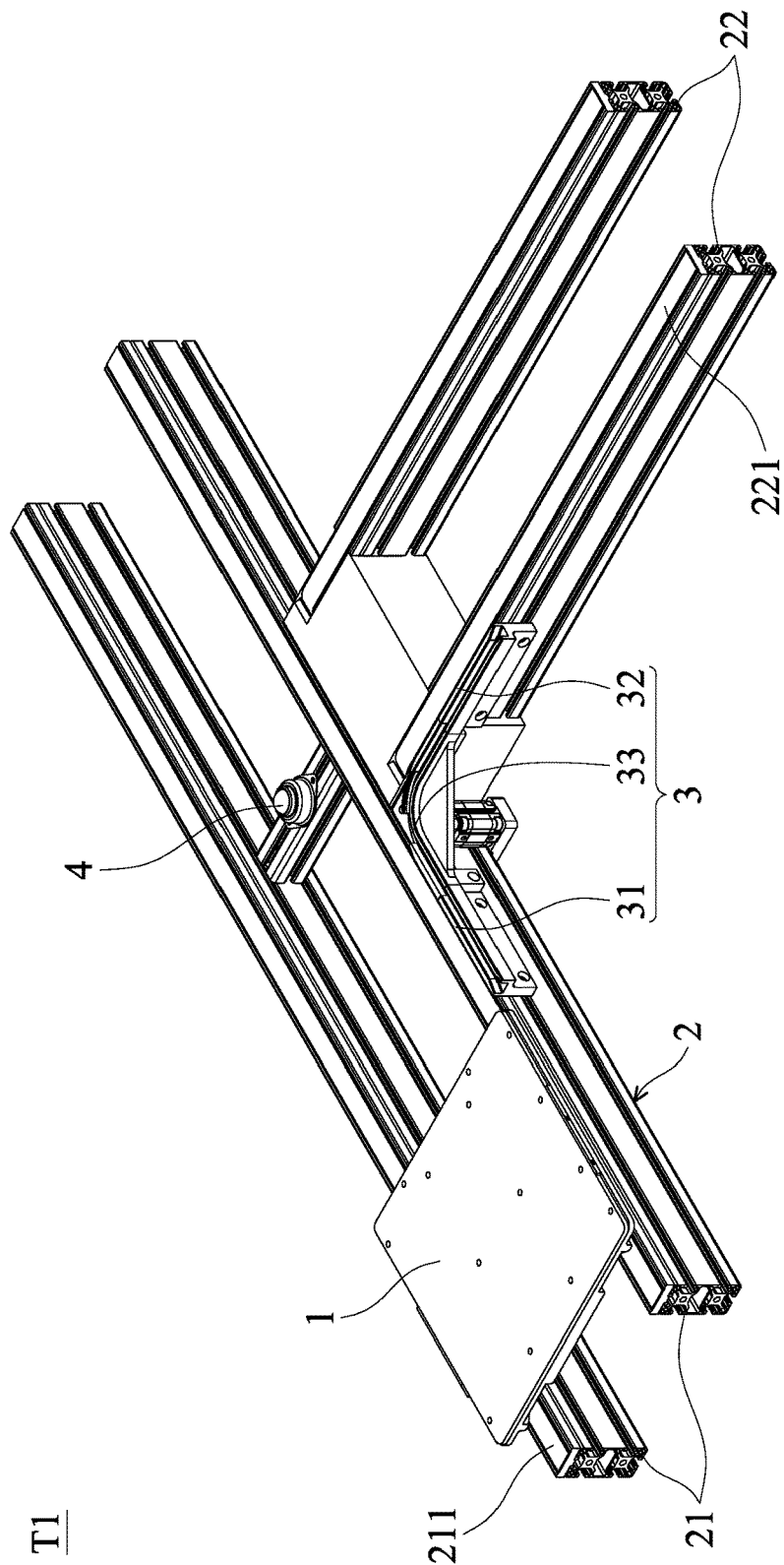
FIGS. 1A and 1B show transmission equipment of the first embodiment of the invention, wherein the transmission equipment is in a first state.
Figure 1B:
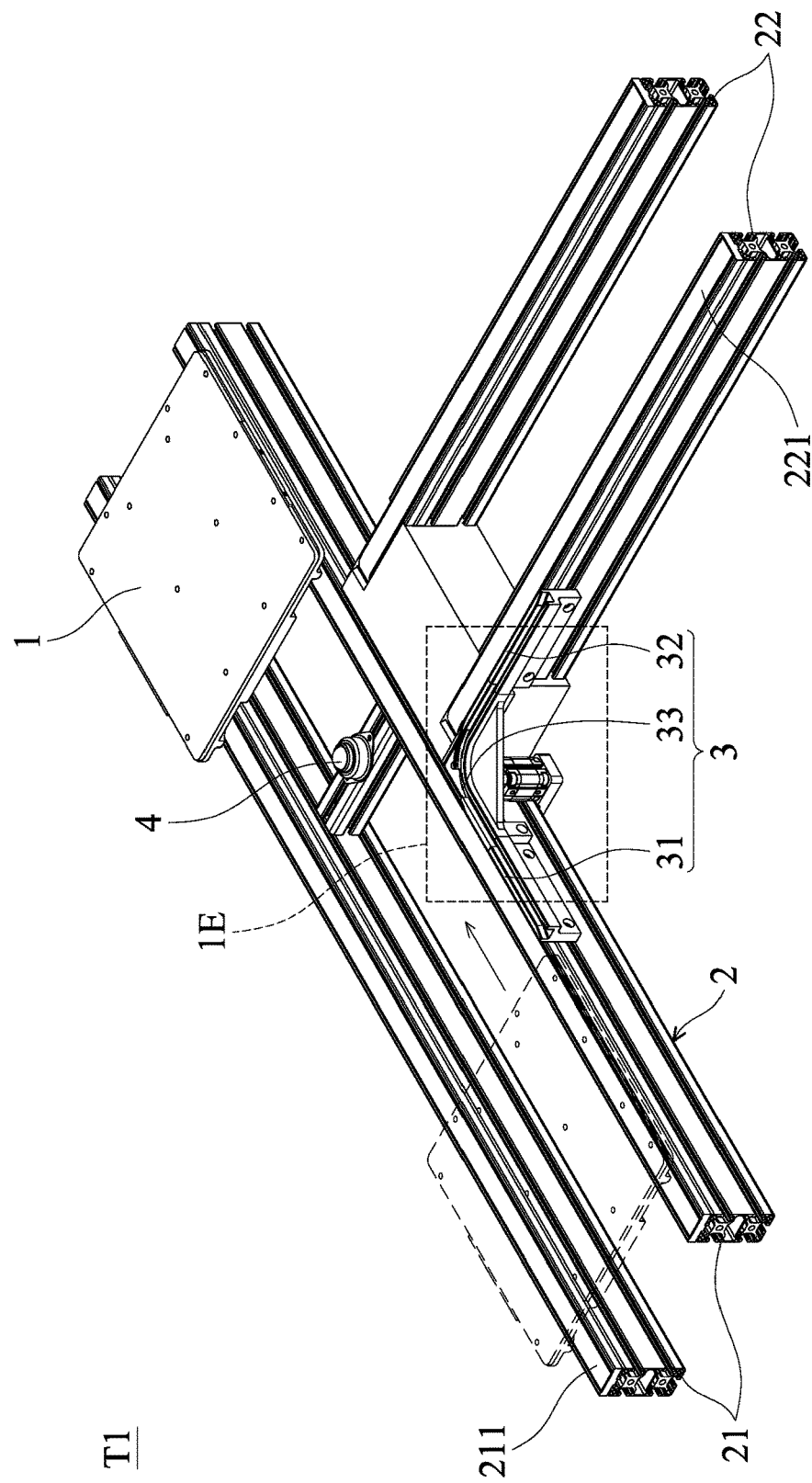
Figure 1C:
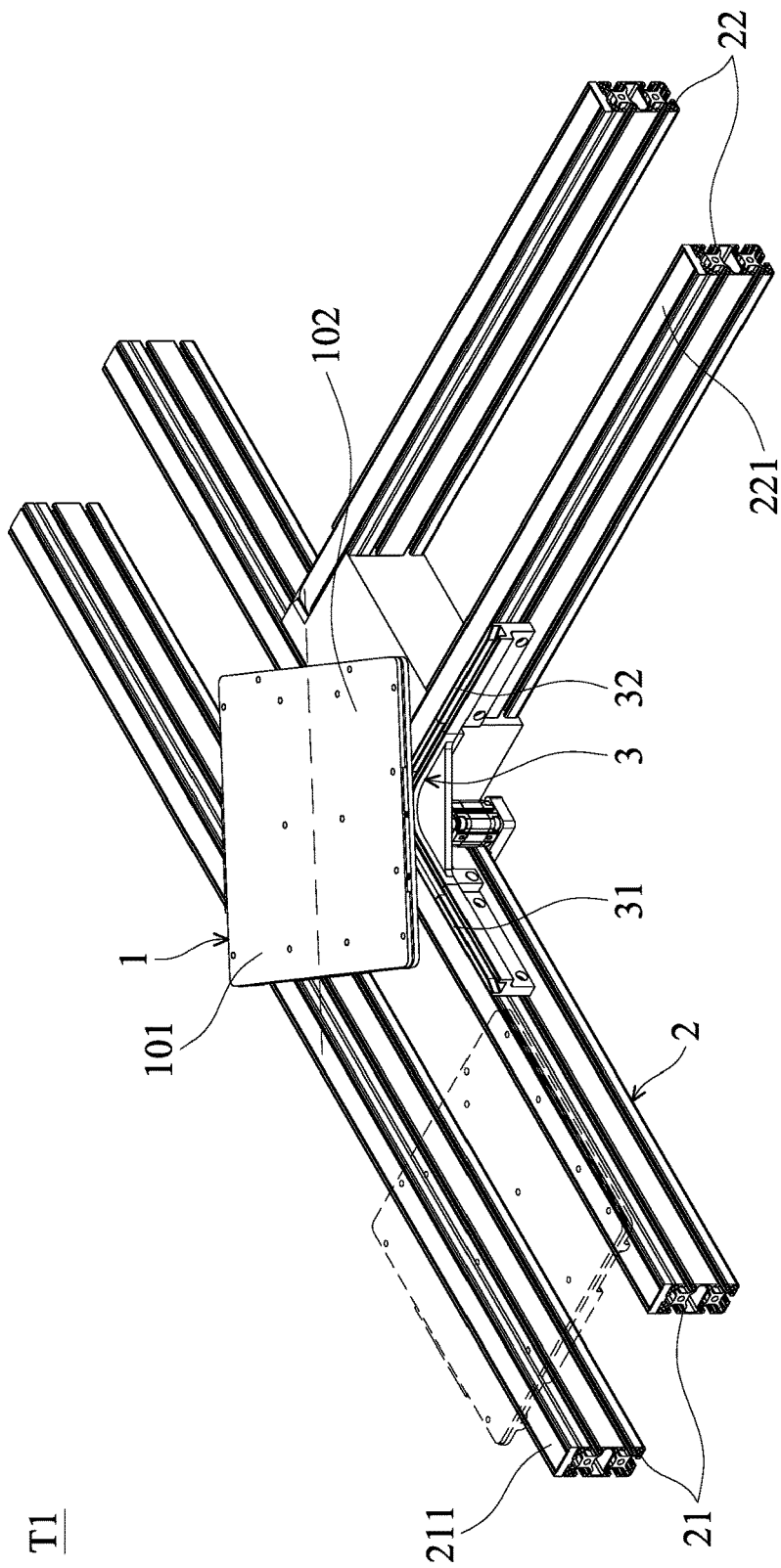
FIGS. 1C and 1D show the transmission equipment of the first embodiment of the invention, wherein the transmission equipment is in a second state.
Figure 1D:
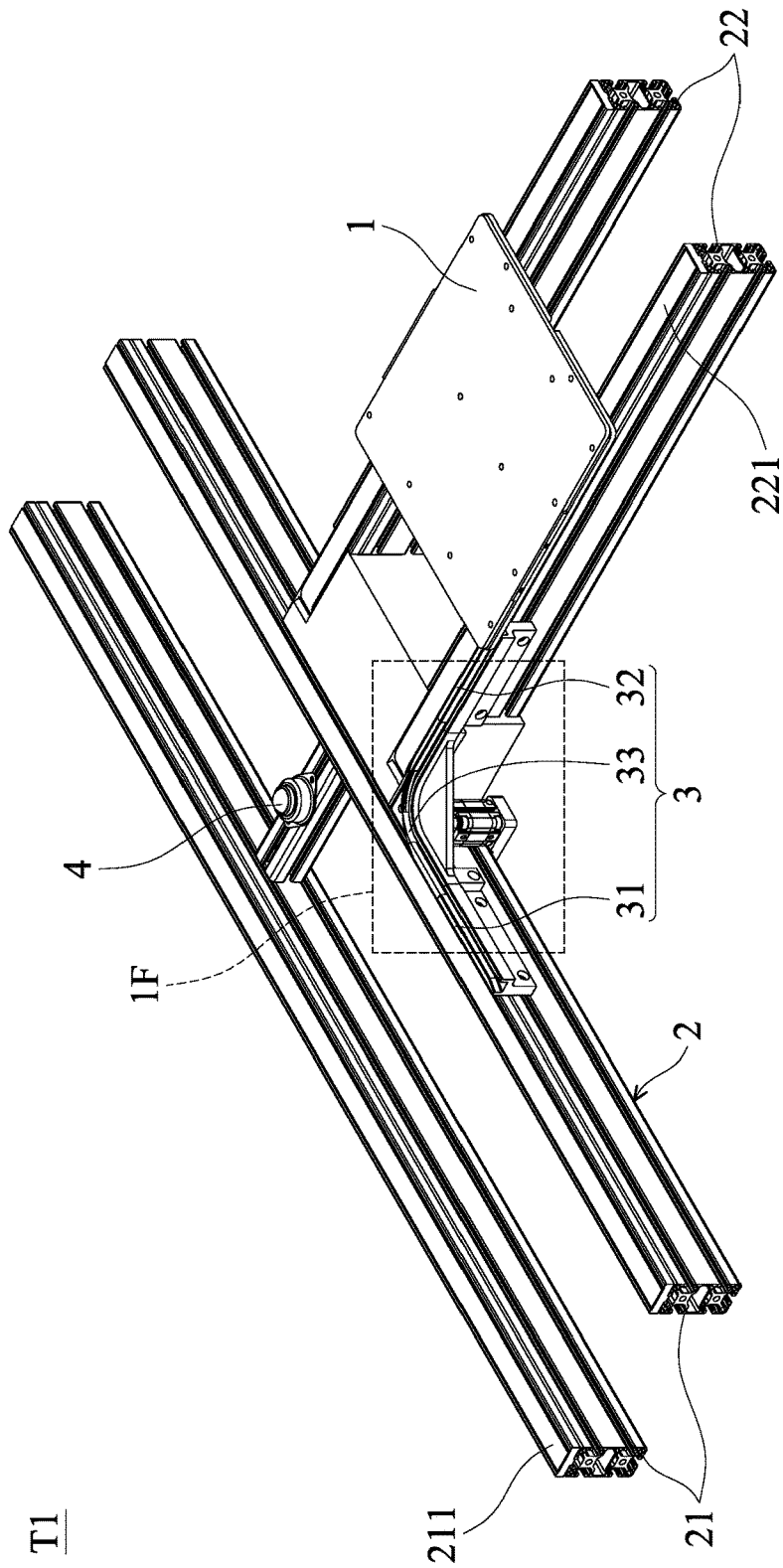
Figure 1E:
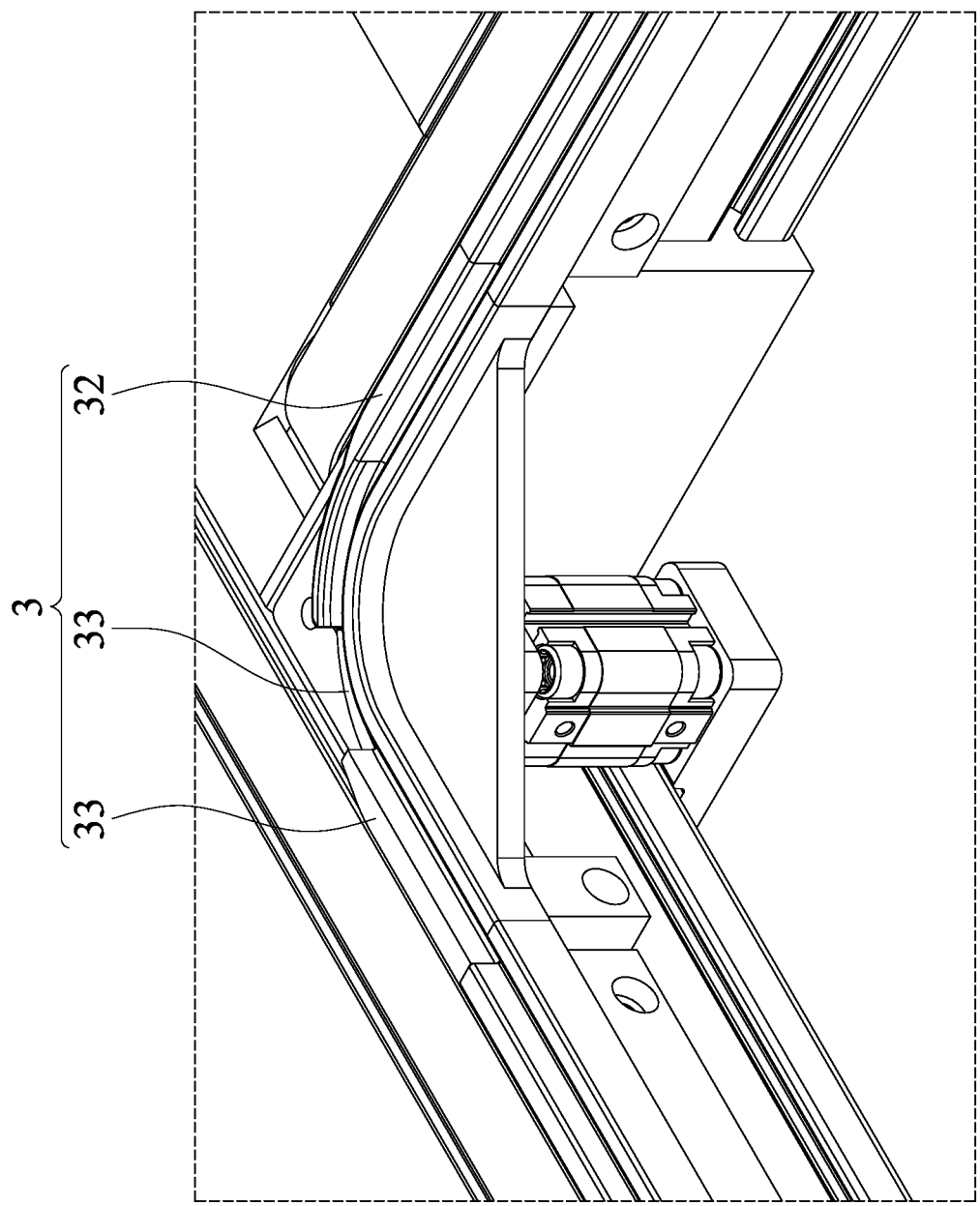
FIGS. 1E and 1F are enlarged views of a turning member of the first embodiment of the invention in a first position and a second position.
Figure 1F:
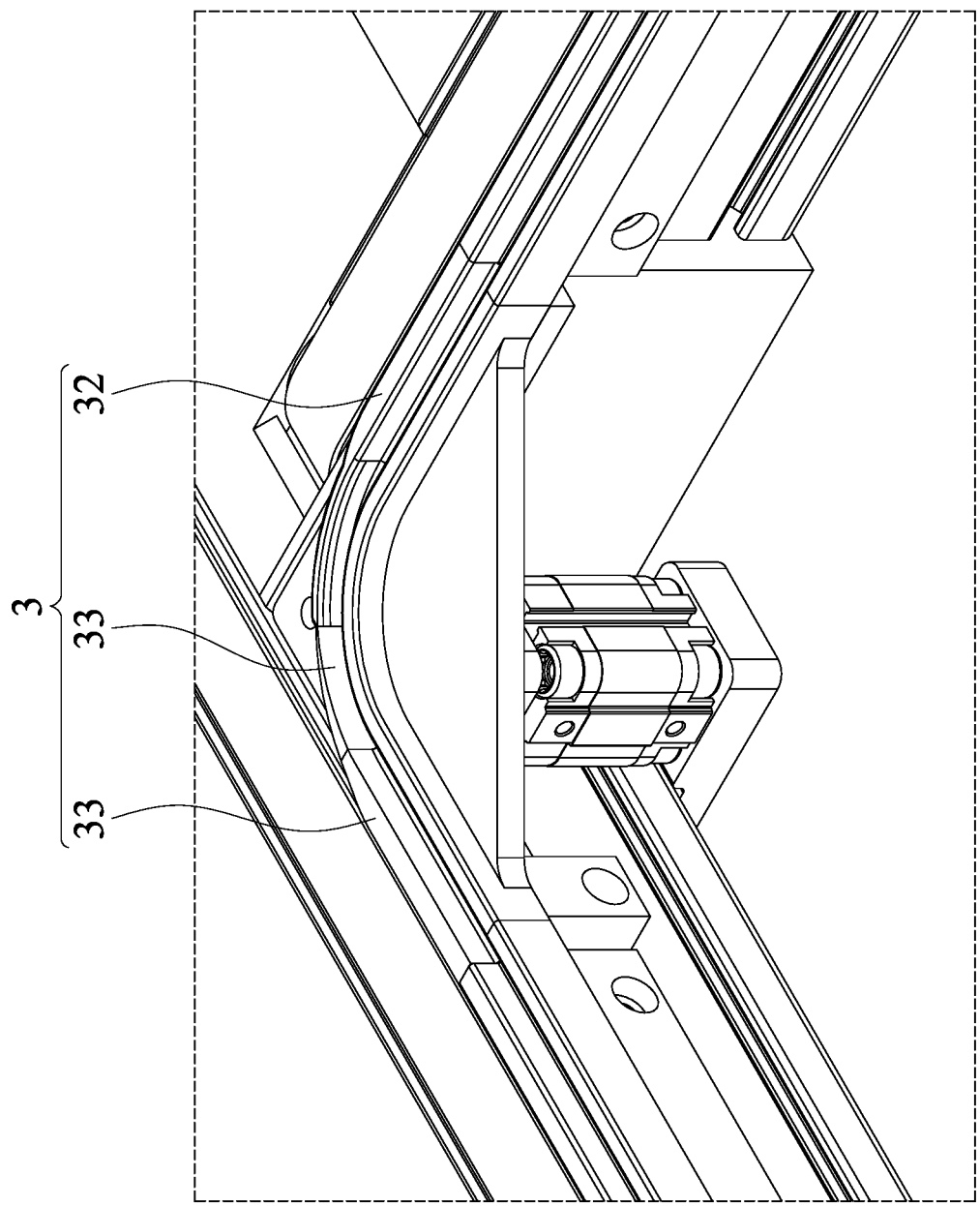
Figure 2:
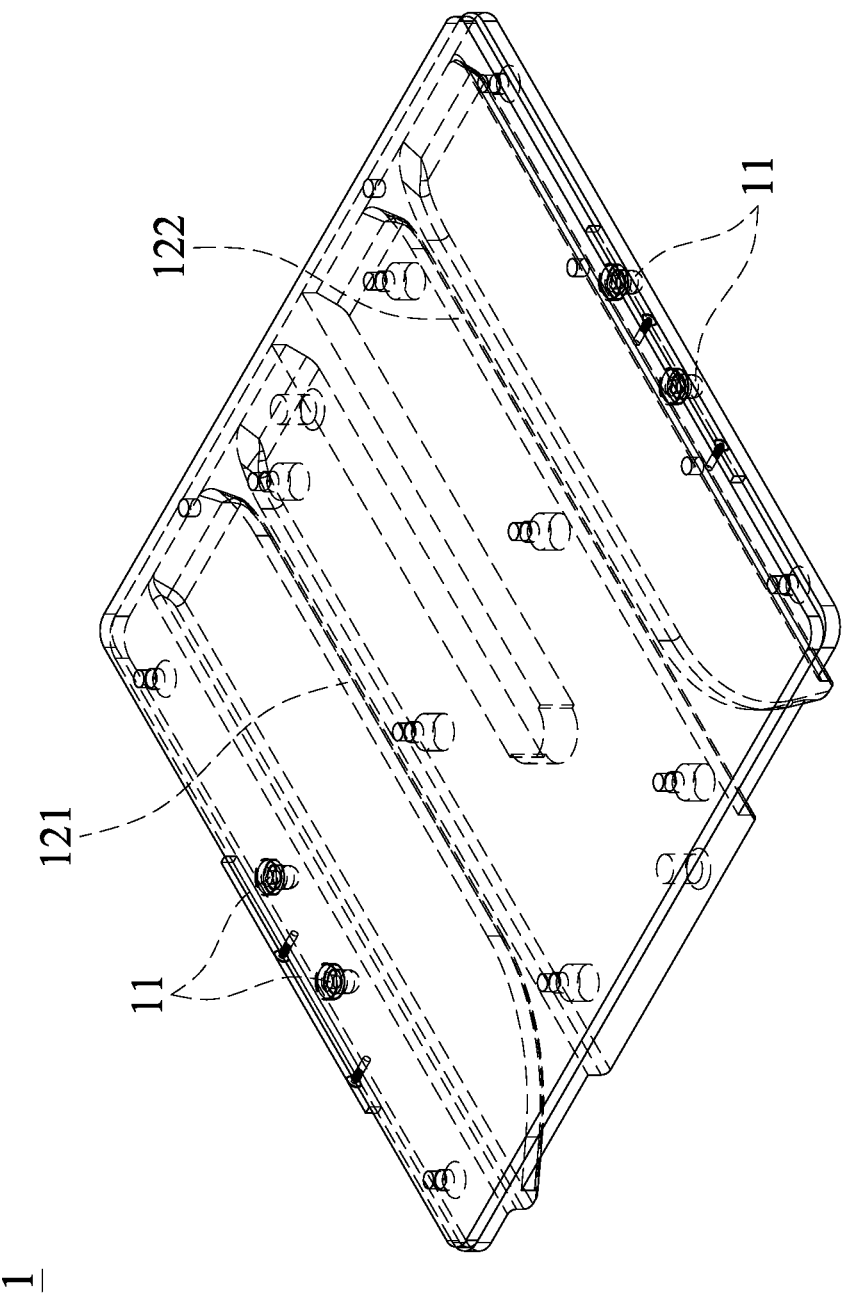
FIG. 2 shows the details of a carrier of the embodiments of the invention.

FIG. 1A shows transmission equipment T1 of a first embodiment of the invention. The transmission equipment T1 includes a carrier 1 and a transmission rail 2. FIG. 2 shows the details of the carrier 1. With reference to FIG. 2, the carrier 1 comprises at least one carrier guiding structure 11. With reference to FIGS. 1A, 1B, 1C and 1D, the transmission rail 2 comprises a first rail 21, a second rail 22 and a turning unit 3. The first rail 21 comprises at least one first transmission member 211. The second rail 22 comprises at least one second transmission member 221. The turning unit 3 comprises a first guiding slot 31, a second guiding slot 32 and a turning member 33. At least one portion of the first guiding slot 31 is parallel to the first rail 21. At least one portion of the second guiding slot 32 is parallel to the second rail 22. The turning member 33 moves between a first position (FIGS. 1A and 1B) and a second position (FIGS. 1C and 1D). FIGS. 1E and 1F are enlarged views of the turning member 33 in the first position and the second position. In a first state (in this embodiment, straight moving state), the turning member 33 is in the first position (FIG. 1B), the carrier guiding structure 11 enters the first guiding slot 31 and passes over the turning member 33, and the carrier 1 keeps moving in the first rail 21. In a second state (in this embodiment, shunting state), the turning member 33 is in the second position (FIGS. 1C and 1D), the carrier guiding structure 11 enters the first guiding slot 31 and is guided by the turning member 33 into the second guiding slot 32, and the carrier 1 then moves in the second rail 22.

In this embodiment, the turning member 33 is a liftable guiding wall. The first transmission member 211 and the second transmission member 221 are belts. However, the disclosure is not meant to restrict the invention. For example, the first transmission member 211 and the second transmission member 221 can be transmission chains.

With reference to FIG. 2, in one embodiment, the carrier guiding structure 11 comprises a plurality of carrier guiding posts. The carrier guiding posts are adapted to rotate relative to the carrier 1. In this embodiment, the carrier guiding posts are disposed on two sides of the carrier 1.

With reference to FIG. 1A, in this embodiment, the first rail 21 is perpendicular to the second rail 22. The turning member 33 is located between the first guiding slot 31 and the second guiding slot 32. An included angle between the first guiding slot 31 and the second guiding slot 32 is 90 degrees. When the carrier 1 moves from the first rail 21 to the second rail 22, the carrier 1 turns 90 degrees.

With reference to FIG. 1A, in this embodiment, the transmission equipment T1 further comprises a support unit 4 disposed in the first rail 21. In the second state, the support unit 4 supports the carrier 1 to reduce the friction between the carrier 1 and the transmission rail 2, and the carrier 1 turns smoothly. Particularly, in one embodiment, the support unit 4 comprises a support roller. With reference to FIGS. 1C and 1D, in one embodiment, the carrier 1 comprises a first portion 101 and a second portion 102. In the second state, the support unit 4 supports the first portion 101 of the carrier 1, and the second portion 102 is located between the first portion 101 and the turning unit 3.

In the first embodiment of the invention, utilizing the turning unit 3, the component of force provided by the first transmission member 211 turns the carrier 1 for 60 degrees.

Figure 3A:
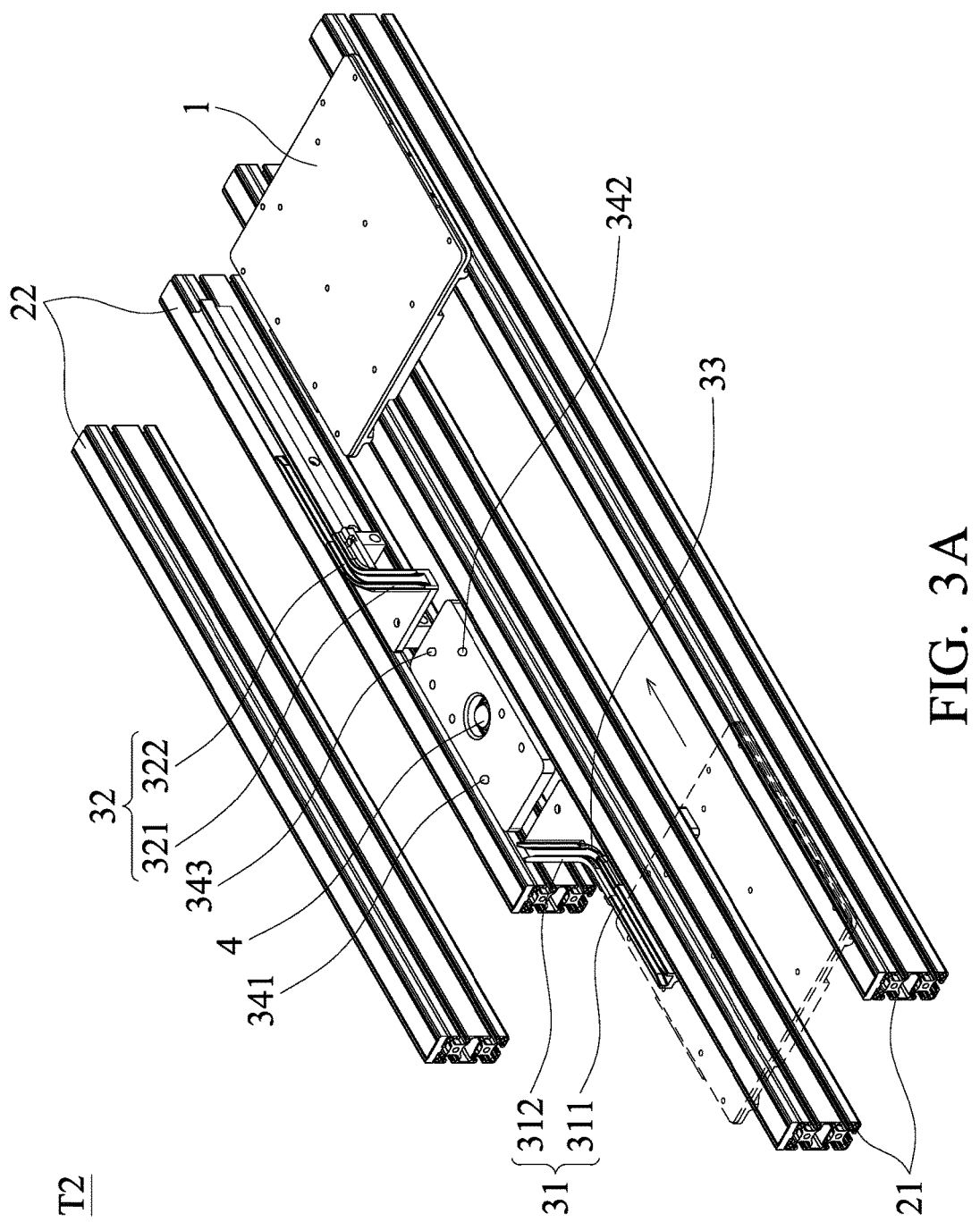
FIG. 3A shows transmission equipment of the second embodiment of the invention, wherein the transmission equipment is in a first state.

FIG. 3A shows transmission equipment T2 of a second embodiment of the invention. In this embodiment, the first rail 21 is parallel to the second rail 22. In one embodiment, the first guiding slot 31 comprises a first section 311 and a second section 312. The second guiding slot 32 comprises a third section 321 and a fourth section 322. The first section 311 is parallel to the first rail 21. The fourth section 322 is parallel to the second rail 22. The second section 312 is parallel to the third section 321. The turning member 33 is located between the first section 311 and the second section 312.

With reference to FIG. 3A, in the first state, the turning member 33 is in the first position (FIG. 3A), the carrier guiding structure 11 enters the first guiding slot 31 and passes over the turning member 33, and the carrier 1 keeps moving in the first rail 21.

Figure 3B:
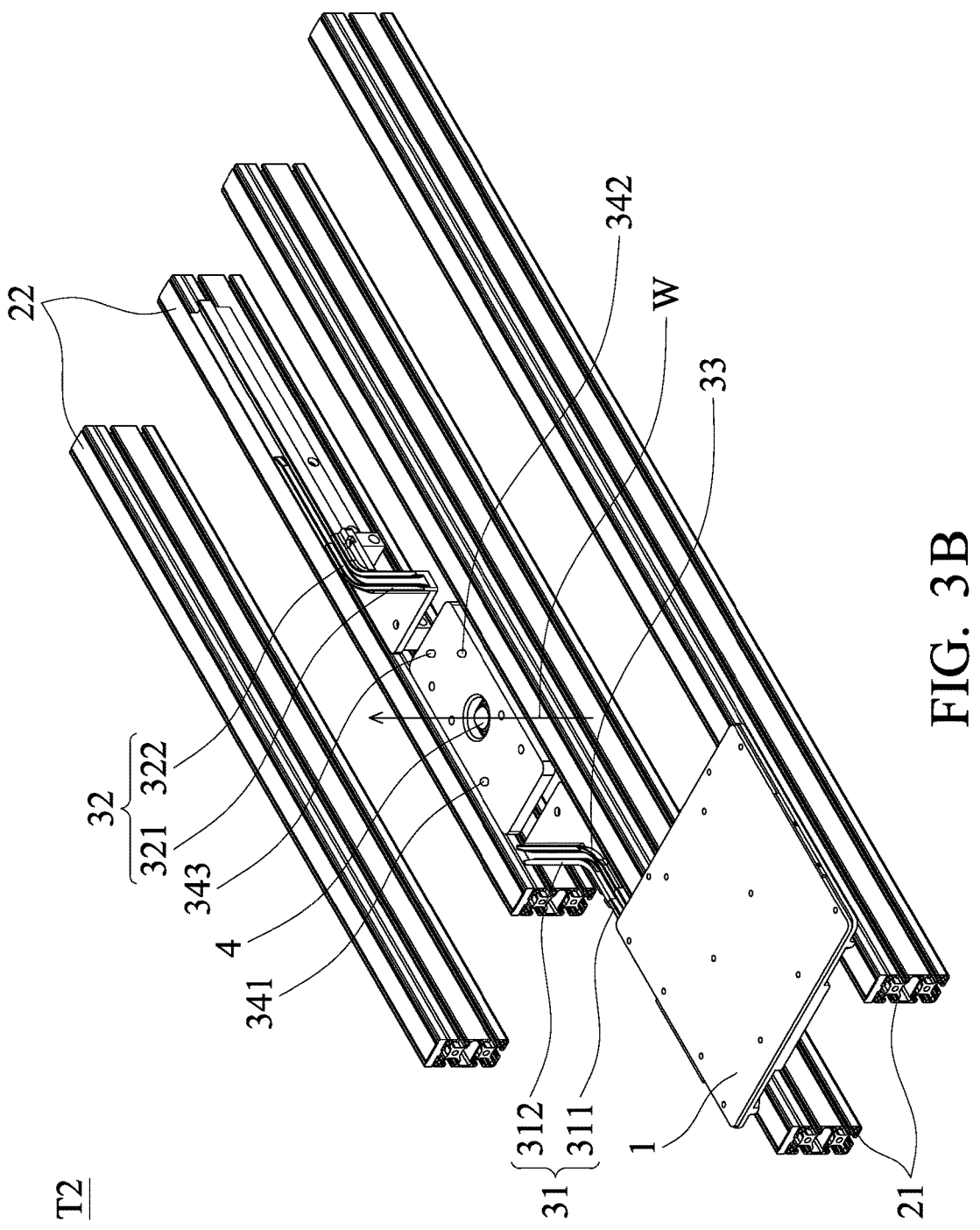
FIGS. 3B, 3C and 3D show the transmission equipment of the second embodiment of the invention, wherein the transmission equipment is in a second state.
Figure 3C:
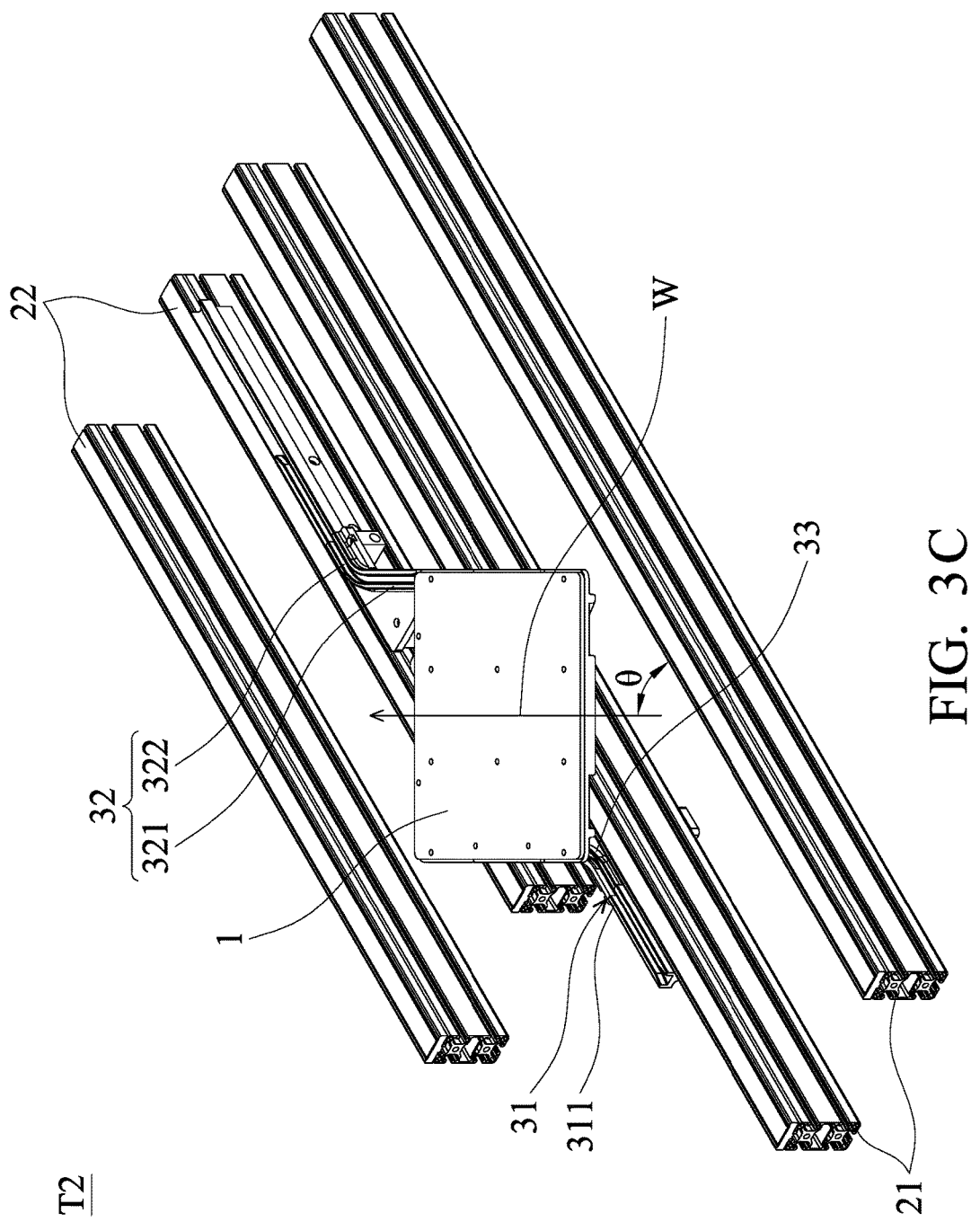
Figure 3D:
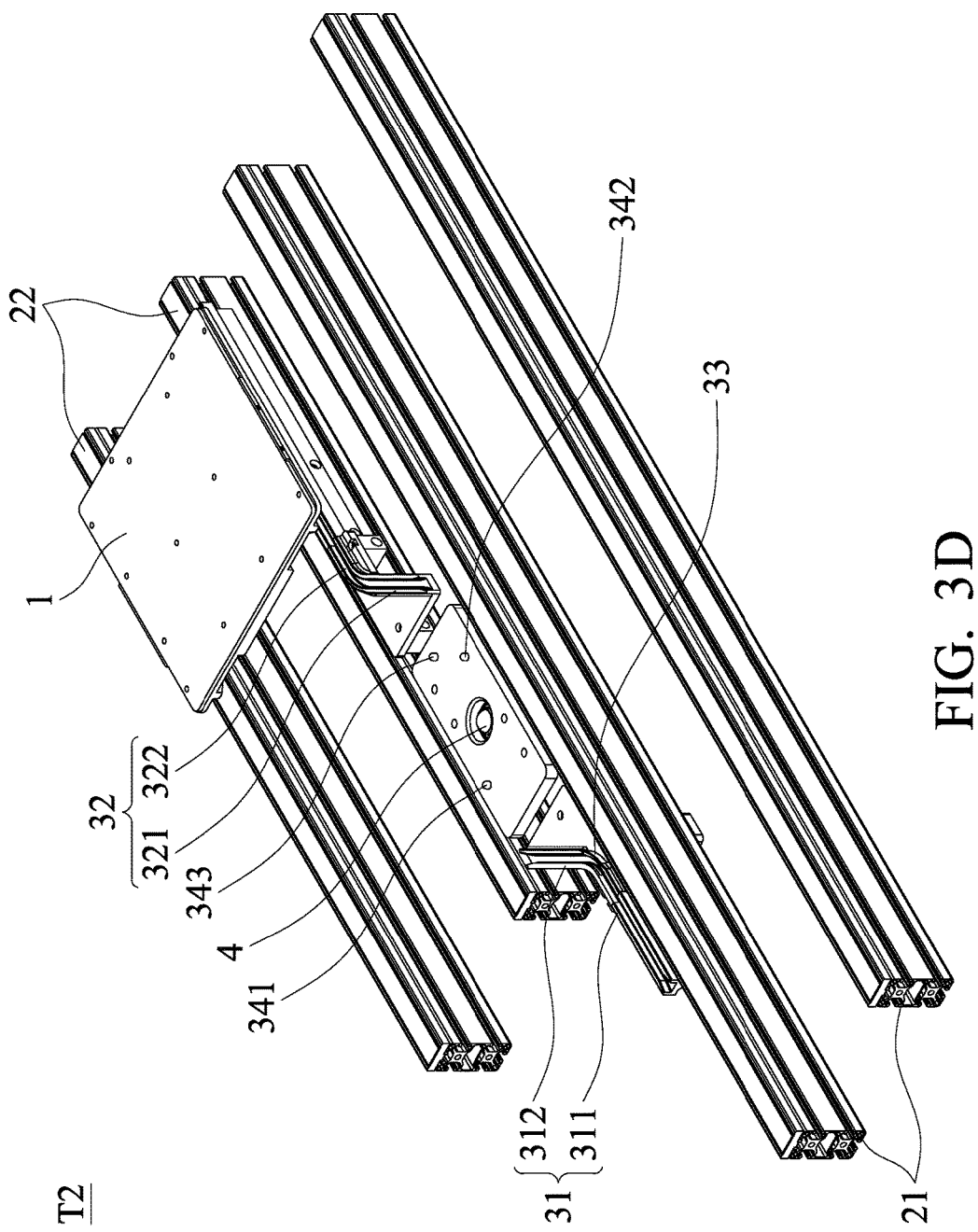

With reference to FIGS. 3B, 3C and 3D, in the second state, the turning member 33 is in the second position, and the carrier guiding structure 11 enters the first section 311 guided by the turning member 33 and passes the second section 312, the third section 321 and the fourth section 322, and the carrier 1 then moves in the second rail 22.

With reference to FIGS. 3B, 3C and 3D, in this embodiment, similarly, the transmission equipment T2 further comprises a support unit 4 disposed between the first rail 21 and the second rail 22. In the second state, the support unit 4 supports the carrier 1 to reduce the friction between the carrier 1 and the transmission rail 2, and the carrier 1 turns smoothly. Particularly, in one embodiment, the support unit 4 comprises a support roller.

With reference to FIGS. 3B, 3C and 3D, in one embodiment, the turning unit 3 further comprises a first shunting post 341 and a second shunting post 342. The carrier 1 comprises a first carrier slot 121 and a second carrier slot 122. When the carrier 1 moves between the second section 312 and the third section 321, the first shunting post 341 and the second shunting post 342 respectively enter the first carrier slot 121 and the second carrier slot 122 to guide the carrier 1.

With reference to FIGS. 3B, 3C and 3D, in one embodiment, when the carrier 1 moves between the second section 312 and the third section 321, the carrier 1 moves in a shunting direction W, and an included angle 9 between the shunting direction W and the first rail 21 is 45 degrees.

With reference to FIG. 3B, in one embodiment, the second shunting post 342 and an inlet of the third section 321 are located on a first straight line L. The first straight line L is parallel to the first rail 21. In one embodiment, the turning unit 3 further comprises a third shunting post 343. The second shunting post 342 and the third shunting post 343 are on a second straight line (not shown). The second straight line is parallel to the shunting direction W.

With reference to FIG. 2, in one embodiment, two side walls of the first carrier slot 121 extend separately at the two ends of the first carrier slot 121. Two side walls of the second carrier slot 122 extend separately at the two ends of the second carrier slot 122. Therefore, the first shunting post 341, the second shunting post 342 and the third shunting post 343 enter the first carrier slot 121 and the second carrier slot 122 smoothly.

In the second embodiment of the invention, utilizing the turning unit 3, the component of force provided by the first transmission member 211 turns the carrier 1 for 45 degrees. Commonly, utilizing the embodiment of the invention, the carrier 1 can be turned for 45~90 degrees. However, the disclosure is not meant to restrict the invention. The transmission equipment T1 of the first embodiment and the transmission equipment T2 of the second embodiment can be utilized in one single production line.

Utilizing the transmission equipment of the embodiment of the invention, the mail rail (for example, the first rail or the second rail) keeps moving when the carrier changes its direction. The production efficiency is therefore increased. Compared to conventional transmission equipment, the transmission equipment of the embodiment of the invention has a simpler structure and improved reliability.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmission equipment, comprising:
a carrier, comprising at least one carrier guiding structure; and
a transmission rail, comprising:
a first rail, comprising a first inner rail, a first outer rail arranged in parallel to the first inner rail and at least one first transmission member disposed on the first inner rail and the first outer rail;
a second rail, comprising a second inner rail, a second outer rail arranged in parallel to the second inner rail and at least one second transmission member formed on the second inner rail and the second outer rail; and
a turning unit disposed between the first inner rail and the second inner rail, wherein a distance between the first inner rail to the turning unit is less than a distance between the first outer rail to the turning unit, and a distance between the second inner rail to the turning unit is less than a distance between the second outer rail to the turning unit, and the turning unit comprises a first guiding slot, a second guiding slot and a turning member, wherein at least one portion of the first guiding slot is parallel to the first rail, at least one portion of the second guiding slot is parallel to the second rail, the turning member moves between a first position and a second position and is disposed between the first guiding slot and the second guiding slot,
wherein in a first state, the turning member is in the first position, the carrier guiding structure enters the first guiding slot and passes over the turning member, and the carrier keeps moving in the first rail in a first direction,
wherein in a second state, the turning member is in the second position, the carrier guiding structure enters the first guiding slot and is guided by the turning member into the second guiding slot, is driven only by the first transmission member and/or the second transmission member, and the carrier then moves in the second rail in a second direction,
wherein the carrier guiding structure comprises a plurality of carrier guiding posts, and the carrier guiding posts are adapted to rotate relative to the carrier,
wherein the carrier guiding posts are disposed on two sides of the carrier, and
wherein a moving plane is defined by the first direction and the second direction, and the turning member moves parallel to a normal vector of the moving plane.

2. The transmission equipment as claimed in claim 1, wherein the first rail is perpendicular to the second rail, the turning member is located between the first guiding slot and the second guiding slot, and an included angle between the first guiding slot and the second guiding slot is 90 degrees, and when the carrier moves from the first rail to the second rail, the carrier turns 90 degrees.

3. The transmission equipment as claimed in claim 2, further comprising a support unit, disposed in the first rail, wherein in the second state, the support unit supports the carrier.

4. The transmission equipment as claimed in claim 3, wherein the support unit comprises a support roller.

5. The transmission equipment as claimed in claim 3, wherein the carrier comprises a first portion and a second portion, in the second state, the support unit supports the first portion of the carrier, and the second portion is located between the first portion and the turning unit.

6. The transmission equipment as claimed in claim 1, wherein the first transmission member is disposed along the first rail, and when the carrier is on the first rail, the first transmission member moves the carrier, and the second transmission member is disposed along the second rail, and when the carrier is on the second rail, the second transmission member moves the carrier.

7. The transmission equipment as claimed in claim 6, wherein the first transmission member and the second transmission member are belts or transmission chains.

8. The transmission equipment as claimed in claim 1, wherein when the carrier changes its moving direction from the first state to the second state, the carrier is only driven by the first transmission member and the second transmission member move in longitudinal directions.

* * * * *